April 14, 1931. J. RUTHS 1,800,959
STEAM PLANT
Original Filed April 29, 1925
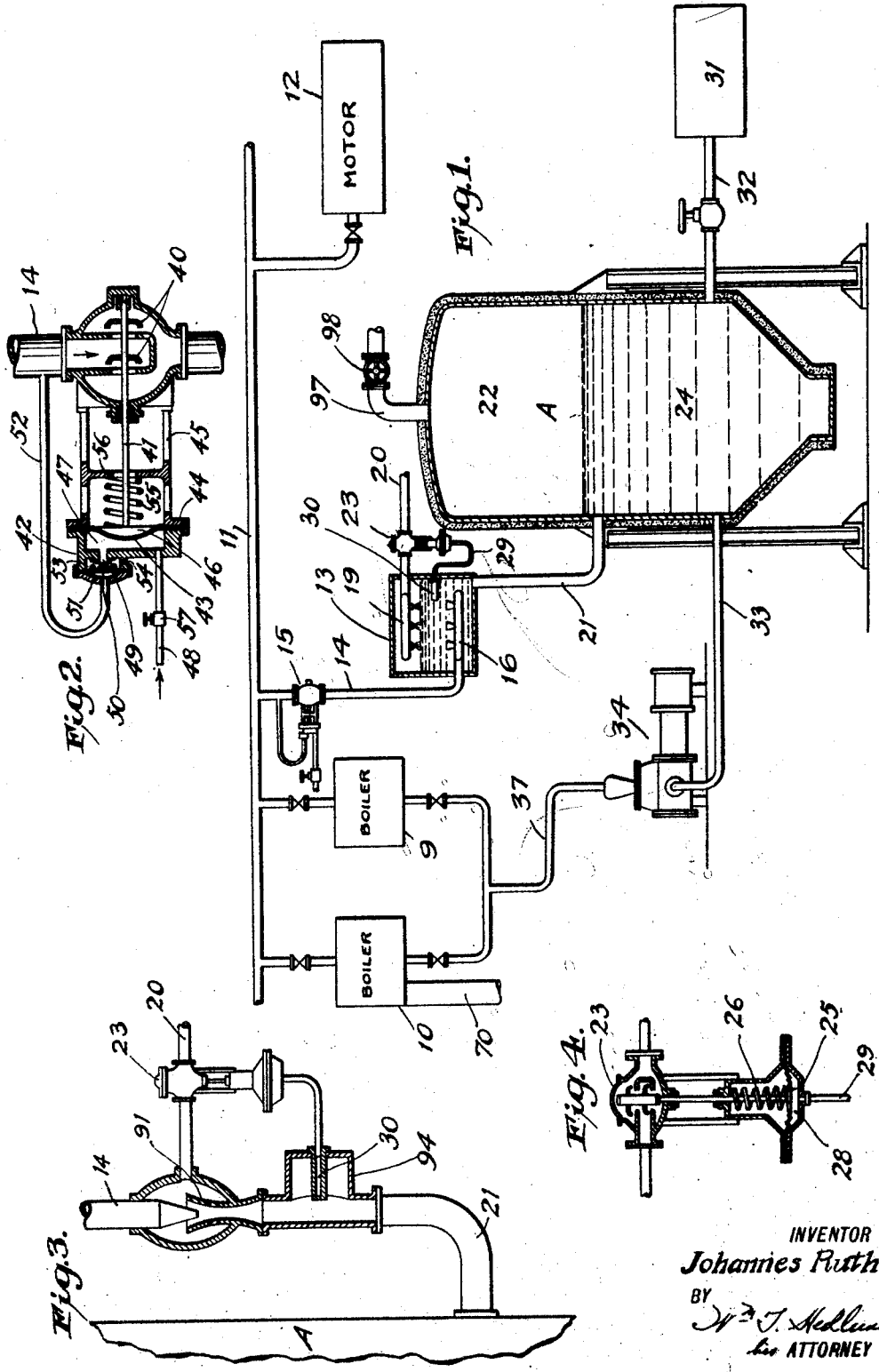
INVENTOR
Johannes Ruths
BY
his ATTORNEY Patented Apr. 14, 1931

1,800,959

UNITED STATES PATENT OFFICE

JOHANNES RUTHS, OF DJURSHOLM, SWEDEN, ASSIGNOR TO RUTHS ACCUMULATOR AKTIEBOLAG

STEAM PLANT

Original application filed April 29, 1925, Serial No. 26,727, and in Sweden January 13, 1922. Divided and this application filed January 25, 1926. Serial No. 83,573.

This application is a division of my copending application, Serial No. 26,727, filed April 29, 1925, Patent No. 1,585,791 granted May 25, 1926.

My invention relates to the accumulation of heat in steam plants and more particularly to the accumulation of hot water for use as feed water or for industrial purposes.

Among the purposes of the invention are: to equalize between heat generation and heat consumption in a steam plant, particularly where variations are such that equalization can be effected through feed reserve or where there is a demand for hot water for industrial purposes; to increase production in a steam plant; to take care of variable supply of heat to boilers and to maintain constant conditions in various parts of a plant.

By the present invention an accumulator can be built which is many times smaller and much less costly than the known steam accumulator of variable pressure; boiler firing can be made entirely independent of consumption of steam or hot water; hot water is always in reserve in any desired quantity at a given temperature; boilers can be run with the best efficiency and other advantages are obtained as will be apparent from the description following:

The present application is particularly concerned with an arrangement wherein a mixing of steam and cold water takes place in a small receptacle whereby hot water is produced and from which receptacle the hot water produced is conducted to a large accumulator tank.

The various features of the invention will be apparent as the description proceeds which is to be taken in connection with the accompanying drawings wherein: Fig. 1 shows a plant according to the present invention, including essential features necessary to carry out the operation as herein set forth; Fig. 2 shows a detail of one form of over-flow valve used in the plant of Fig. 1; Fig. 3 shows a modified form of the small mixing receptacle of Fig. 1; and Fig. 4 shows a section on an enlarged scale of the water control valve of Figs. 1 and 3.

My invention is applicable to steam plants having any kind of boilers for producing steam in any manner. In Fig. 1 are shown two boilers 9 and 10 of which 9 may be considered as coal fired and 10 as fired by waste heat supplied through flue 70. The steam generated in the boilers passes into the steam conduit 11 from which a part of the steam generated passes to a steam consumer 12 which may be, as indicated, a motor. The remainder of the steam passes through conduit 14 to a small receptacle 13.

Inserted in conduit 14 is an over-flow valve 15. This valve is controlled by the pressure in front of the same which in the case illustrated is the boiler pressure and also the supply pressure for consumer 12. The valve 15 operates to maintain a constant pressure in conduit 11 and allows the surplus of steam generated over what is used by the consumer 12 to pass into receptacle 13 where it is condensed by cold water supplied through conduit 20 and from which the hot water produced passes through conduit 21 to the accumulator tank A.

A designates my novel heat accumulator which might be termed a constant temperature, variable water level accumulator, since it is a characteristic feature of this accumulator that in normal operation its temperature is maintained constant and the water level in the same varies in accordance with the amount of heat stored in the same.

The accumulator may be made in a number of ways. As an example of one way of making the same I have shown a vertical cylindrical receptacle which is suitably supported in any desired manner. The accumulator has a steam space 22 and a water space 24, the volume of which vary as the water level varies. The accumulator is preferably designed so that it can receive and store all the surplus steam regardless of the amount of the steam; that is, the accumulator should be designed so that it can always receive and store the difference between what is generated by the boilers and what is consumed by consumers connected in front of the overflow valve, regardless of how large this difference may be. This matter depends, however, on the manner in which it is desired that the boilers are fired. With greater variation of fire intensity smaller accumulators may be used. However, having in mind independence of boiler firing and steam and heat consumption, the accumulator will be designed most rationally if it is of sufficient capacity so that none or very slow changes of fire intensity under the boilers need take place, or where the heat to the boilers is supplied by waste gas so that no gas need be thrown away or so that manually controlled boilers working in connection with waste heat boilers need not be fired too unevenly.

Cold water is supplied through conduit 20 and is sprayed into the steam space or upper part of receptacle 13 through the cold water spray device 19. The amount of cold water supplied through pipe 20 is regulated so that a constant temperature is maintained in receptacle 13 and consequently the temperature in accumulator A is constant or substantially constant. The flow of cold water through conduit 20 is regulated by means of a cold water regulating valve 23, which is controlled by an actuating mechanism comprising a diaphragm 25 (see Fig. 4) which diaphragm is influenced on the one side by a spring 26 and on the other side by the pressure of a volatile liquid in chamber 28. Tube 29 connects chamber 28 with a thermostat 30 which is situated in receptacle 13 preferably in the lower part thereof so as to be surrounded by water. The thermostat may be of any known kind. Obviously the regulating device for the supply of cold water may be of various forms and it is immaterial to the present invention which type of regulation be used so long as the function remains substantially the same.

As steam enters receptacle 13 through charging device 16, which comprises a series of nozzles opening into the water space, the temperature increases slightly. The volatile liquid in thermostat 30 then expands and the increase of pressure due to expansion is transmitted to diaphragm 25 which moves the disks of valve 23 upwardly, thus opening the valve 23 and allowing cold water in increased amount to enter the upper part of receptacle 13 through spray device 19, thus condensing steam and lowering the temperature by the small increase caused by the supply of steam so that the temperature is returned to its normal value. The arrangement thus maintains a practically constant temperature in the accumulator mixing device and the accumulator tank proper.

Hot water may be extracted from the accumulator for various purposes. For industrial purposes I have shown a hot water consumer 31 connected to receive hot water from the accumulator by means of hot water conduit 32. The hot water consumer may, as is obvious, be of any kind, for example, a dye vat, washing machine, or the like.

For boiler feeding hot water is extracted through feed conduit 33 by means of pump 34 and sent into the boiler, the amount being regulated in any desired manner.

I consider my present invention of particular importance for boiler feeding as it provides hot water of constant temperature and permits the heat of off-take gases to be extracted in air preheaters which give higher efficiency than economizers. By combining this advantage with that of independence of heat generation and heat consumption, my invention provides a highly efficient plant.

Fig. 2 shows details of construction of one form of over-flow valve adapted to be used with a plant laid out in accordance with my present invention. The valve comprises a casing enclosing a set of disks 40 forming what is known as a balanced valve. The valve disks are attached to a spindle 41 which is connected to an operating mechanism 42, which operating mechanism comprises a diaphragm 43 firmly connected to a housing 44 which is secured to the main valve casing by means of legs 45. Diaphragm 43 is operatively connected to the end of spindle 41 and rests against a backing plate 46 attached to the spindle. The diaphragm 43 forms one side of a chamber 47 to which an operating fluid is conducted through a restricted pipe 48. This operating fluid may be of any kind whether gaseous such as air, or liquid such as water or oil.

The operating fluid leaves chamber 47 through an orifice 49 controlled by a check member 50 attached to a second diaphragm 51, which is influenced on the one side by pressure in conduit 14 in front of the valve 15, the pressure acting through pipe 52, and on the other side by the combined influence of the actuating fluid leaving the orifice 49 and a spring 53. The operating fluid leaves the housing and is allowed to flow into the air or other exhaust means through outlet 54. A spring 55 extends between backing plate 46 and a fixed abutment 56.

The operation of the valve is as follows:

Suppose the valve 15 is in the position indicated on the drawing. Now suppose that the pressure in conduit 14 ahead of the valve rises somewhat. The increase of pressure is transmitted through tube 52 onto diaphragm 51, which is moved against the action of spring 53 to throttle the orifice opening 49. This causes an increase of pressure in chamber 47 whereby diaphragm 43 is moved against the action of spring 55 so that the valve disks 40 are caused to move to open the valve more and allow more steam to pass through, which allows the pressure in conduit 14 ahead of the valve to fall, thereby returning it to the desired constant pressure.

Suppose, on the other hand, that the pressure falls in conduit 14 ahead of the valve. The diaphragm 51 then causes member 50 to move away from orifice opening 49 due to the preponderance of force of spring 53 added to the pressure of fluid leaving the orifice opening over the pressure exerted through tube 52, whereby, due to the restriction in pipe 48, shown in Fig. 1 as a hand valve 57, the pressure decreases in the chamber 47 and spring 55 overcomes the opposing effect of fluid pressure in chamber 47, and valve disks 40 are moved to close the main valve whereby the pressure in conduit 14 before the valve is returned to normal. By this means a constant pressure to within a small fraction of a pound can be maintained in conduit 11 and in the boilers.

The present invention presents an advantage over a plant containing an accumulator of variable pressure in that special designs of turbines adapted to take steam from accumulators can be avoided.

There is no restraint on the amount of steam generated. With some systems now in use steam is used to heat feed water but there is always a restraint put on the boiler. A close regulations of fires is necessary. Such systems regulate the amount of steam supplied to heat cold water and when the necessary amount of hot feed water is obtained at the proper temperature, the steam supply is shut off and boiler fires must be reduced in intensity in corresponding degree. My system, however, puts no such limit on the boilers. Steam may be generated in any desired amount at all times and the difference between generation and consumption will always be accumulated.

Furthermore, by means of the over-flow valve, the advantage of constant pressure in the boilers is obtained. It is always considered evidence of good working in a boiler house when the boiler pressure diagrams approximate as closely as possible to straight lines. This gives constant pressure for auxiliaries and main engines, high efficiency of boilers, evenness of control of water level in boilers and other recognized good operating points.

With constant boiler pressure, no accumulation reserve remains in the steam boilers but this is well taken care of by the accumulator.

In the modification shown in Fig. 3 the steam passing through conduit 14 is caused to intimately mix with the cold water by an injector action. Water is supplied through conduit 20 as previously. Steam passes into nozzle 91 carrying water with it and is condensed thereby. The hot water thus produced passes through conduit 21 into the accumulator tank A. The thermostat is, in this case, placed in a pocket 94 arranged in a portion of conduit 21.

In case of peak loads it may be desirable to withdraw steam from accumulator A and for this purpose a steam line 97 which is controlled by a valve 98 is provided. In such case the temperature will momentarily fall in the accumulator and the accumulator will operate more on the principle of the variable pressure steam accumulator.

As will be obvious to those conversant in the art to which this invention relates, various changes may be made in the form and construction of parts and arrangement of the same without departing from the scope or spirit of the invention.

I desire to point out that there are several advantages in having the mixture of cold water and steam take place in a small receptacle separate from the main accumulator in that there is danger in spraying cold water into any hot device due to the difference in temperatures because there may be a strain on the device and this is liable to decrease the life of the device, whereas by causing the mixing to take place in a separate small receptacle, the danger which may exist is confined to the smaller cheaper unit which can more readily and with less cost be replaced than can a large accumulator tank, in that the charging and spraying devices can be made smaller than if they are designed for effective operation within the whole of the inner space of the accumulator tank, and in that the small unit can be better designed for more intimate mixing.

Having described my invention, what I claim is:

1. In a steam plant, in combination, a relatively small receptacle, a cold water spray device in said receptacle, a steam distributing device in said receptacle, means to supply surplus steam generated over momentary steam demand to said receptacle through said steam distributing device, means to supply cold water to said receptacle through said cold water spray device, automatic valve mechanism for controlling the supply of cold water in response to temperature in said receptacle, a relatively large accumulator tank, means to conduct water from said receptacle to said accumulator tank, means to withdraw hot water from said accumulator tank at a rate corresponding to the rate of demand for hot water, the difference between the hot water demand and the hot water produced being retained in the accumulator tank.

2. In a steam plant, in combination, a relatively small receptacle, a cold water spray device in said receptacle, a steam distributing device in said receptacle, means to supply surplus steam generated over momentary steam demand to said receptacle through said steam distributing device, means to supply cold water to said receptacle through said cold water spray device, temperature responsive means to control the cold water supply, a relatively large accumulator tank, means to conduct water from said receptacle to said accumulator tank, means to withdraw hot water from said accumulator tank at a rate corresponding to the rate of demand for hot water, the difference between the hot water demand and the hot water produced being retained in the accumulator tank.

3. In a steam plant, in combination, a steam generator, a steam consumer, a relatively large, constant temperature, variable water level accumulator, a relatively small receptacle, means to conduct steam from said generator to said receptacle, a cold water spray device in said receptacle, a steam distributing device in said receptacle, means to conduct surplus of steam not consumed above that generated to said receptacle through said steam distributing device, means to supply cold water to said receptacle, automatic temperature responsive means to regulate the amount of cold water supplied to maintain a constant temperature of the hot water produced, means to conduct hot water from said receptacle to said accumulator and means to withdraw hot water from said accumulator at a rate corresponding to the rate of demand for hot water, the difference between the hot water demand and the hot water produced being retained in the accumulator.

4. In a steam plant, in combination, a steam generator, a constant temperature variable water level accumulator, a receptacle, a passage for steam from said generator to said receptacle, a valve mechanism in said passage operating to maintain a constant pressure in said steam generator, means to supply cold water to said receptacle, automatic means to control the cold water supply in response to temperature in said receptacle, means to conduct hot water from said receptacle to said accumulator and means to conduct hot water from said accumulator to said steam generator.

5. In a steam plant, in combination, a steam boiler, a constant temperature variable water level accumulator, a receptacle, a passage for steam from said boiler to said receptacle, valve mechanism in said passage operating to maintain a constant pressure in said boiler, means to supply cold water to said receptacle to condense the steam thereto supplied and temperature responsive means operating to maintain constant temperature of hot water produced, means to conduct hot water from said receptacle to said accumulator, a hot water consumer and means to conduct hot water from said accumulator to said hot water consumer.

6. In a steam plant, in combination, a constant temperature variable water level accumulator containing water at different heights for different times, a receptacle, means to supply steam to said receptacle, means to supply cold water to said receptacle to condense said steam and produce hot water, means to conduct hot water from said receptacle to said accumulator, said accumulator being constructed and arranged to store the hot water produced until there is a demand for hot water and means responsive to temperature in the receptacle to control the supply of cold water and operating to normally maintain a constant temperature in the accumulator.

7. In a steam plant, in combination, a constant temperature variable water level accumulator, containing water at different heights for different times, a receptacle, a steam charging device in the lower part of said receptacle, means to supply steam to said steam charging device, means to supply cold water to said receptacle to condense said steam and produce hot water, means to conduct water from said receptacle to said accumulator, said accumulator being constructed and arranged to store the hot water produced until there is a demand for the hot water and means responsive to the temperature in the receptacle to control the supply of cold water and operating to maintain a constant temperature of hot water produced.

In testimony whereof, I have hereunder affixed my signature.

JOHANNES RUTHS.